Nov. 9, 1965  B. WALKER  3,216,703
VEHICLE LIFTING DEVICE
Original Filed Dec. 12, 1958  4 Sheets-Sheet 1
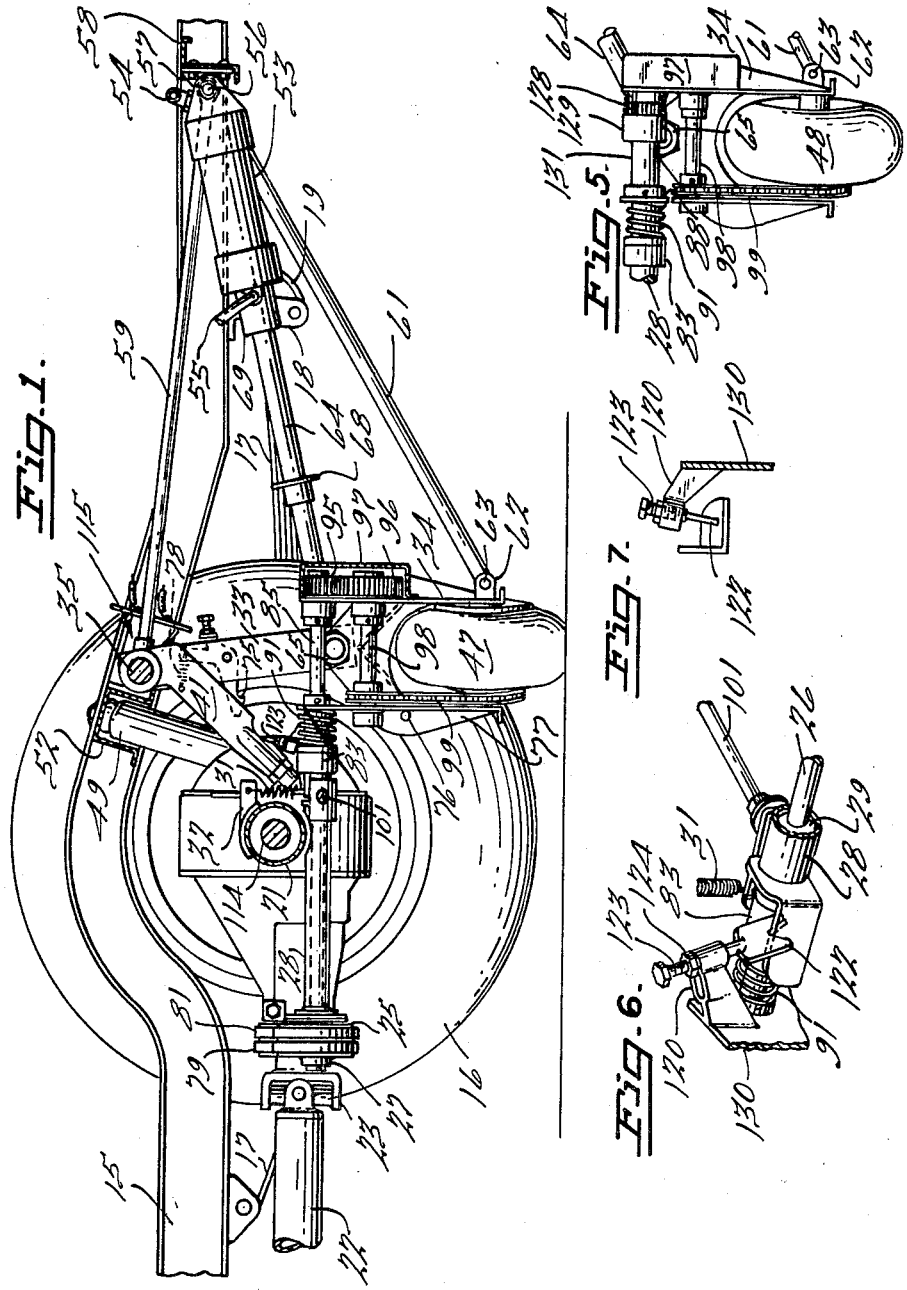
INVENTOR
Brooks Walker
BY Harness, Dickey & Pierce
ATTORNEYS.

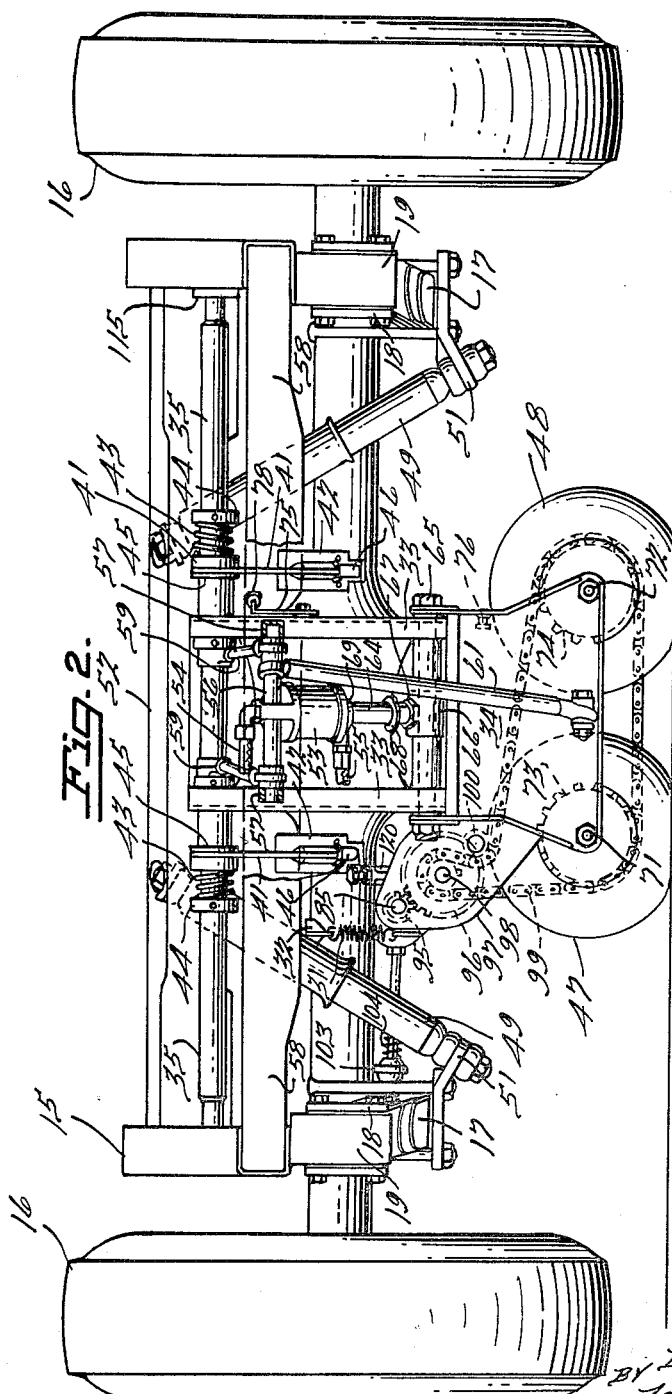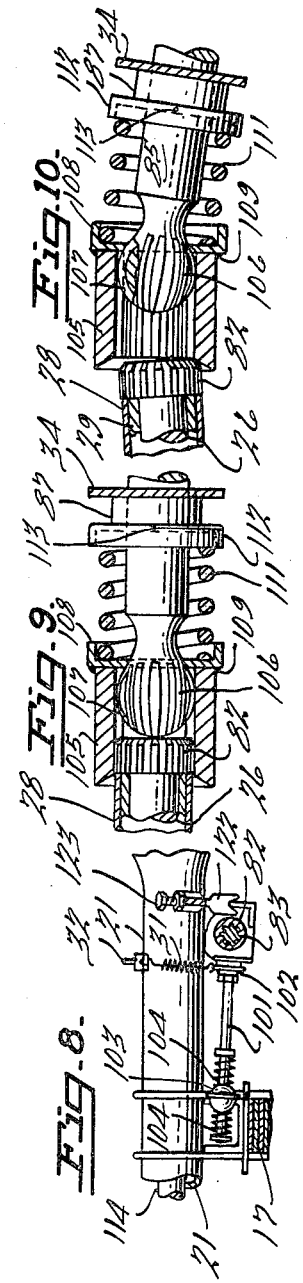

Nov. 9, 1965     B. WALKER     3,216,703

VEHICLE LIFTING DEVICE

Original Filed Dec. 12, 1958     4 Sheets-Sheet 3

INVENTOR.
Brooks Walker
ATTORNEYS

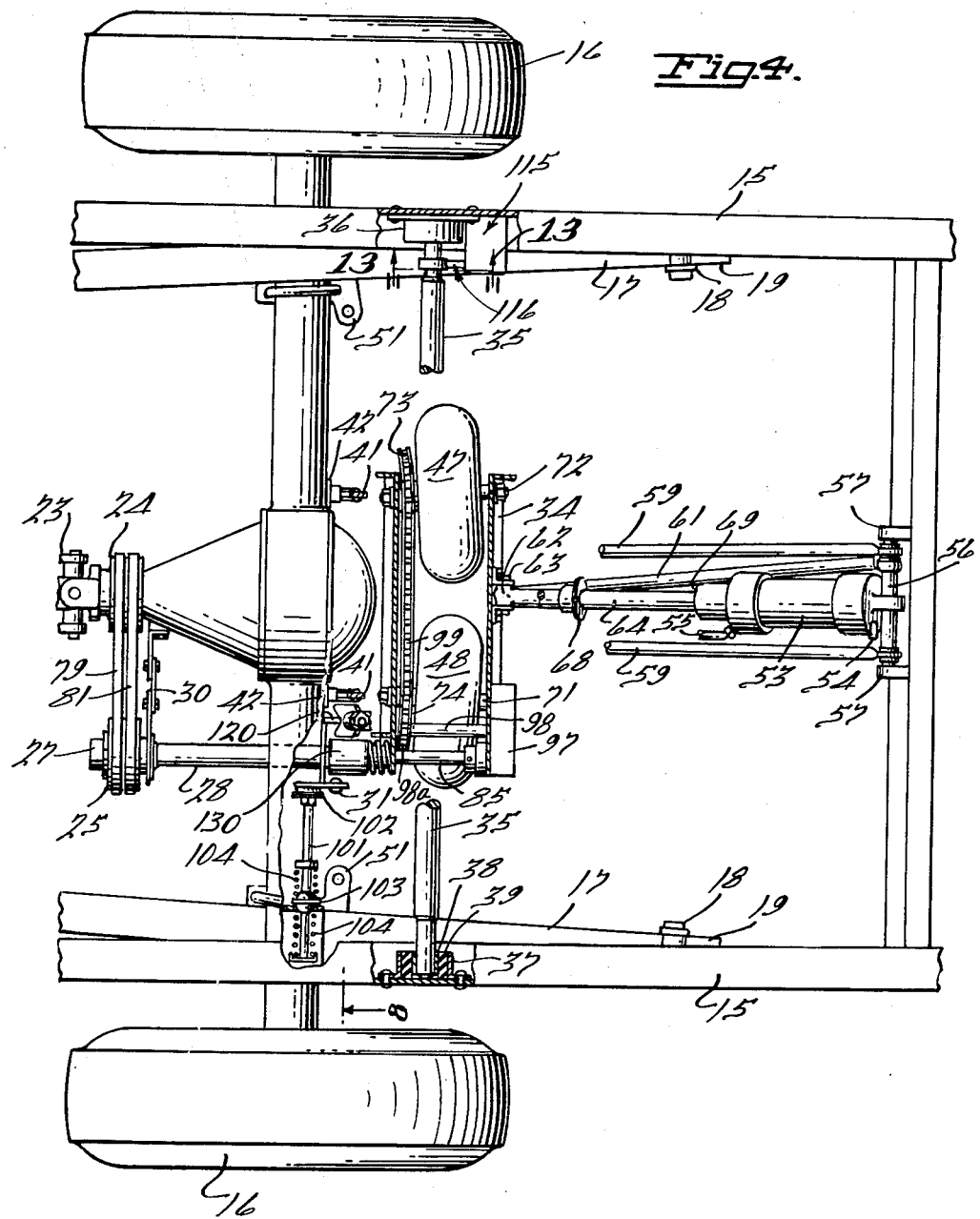

United States Patent Office
3,216,703
Patented Nov. 9, 1965

1

3,216,703
VEHICLE LIFTING DEVICE
Brooks Walker, 1280 Columbus Ave.,
San Francisco 11, Calif.
Original application Dec. 12, 1958, Ser. No. 780,122, now
Patent No. 3,084,756, dated Apr. 9, 1963. Divided
and this application Mar. 3, 1961, Ser. No. 93,251
5 Claims. (Cl. 254—86)

This invention pertains to improvements in vehicle lifting and traversing devices and particularly to a device that is cheaper, lighter, easier to operate, and safer than those proposed previously, and is a division of Ser. No. 780,122, filed Dec. 12, 1958 and since issued as Patent No. 3,084,756.

This invention proposes the use of two small pneumatic or solid cushion tires that raises the car or retracts and folds rearwardly in back of the rear axle so as not to interfere with the conventional drive shaft or ground clearance when in the inactive position. These auxiliary wheels can be mounted on a single toggle that is actuated by a single cylinder, which rear cylinder is mounted on a bracelet that carries radius rods extending to the top and bottom of the toggles so that the lifting stresses are in this assembly rather than transmitted through the vehicle frame and cross members as is the case in most such devices. The supporting rod for the top of the toggle is preferably flexible relative to the mounting in the vehicle frame and carries rear axle lifting means so that when the rear of the vehicle is on the auxiliary wheels it is supported to a large measure through the rear springs and a limited rear spring motion is provided through such rear springs and the flexing of the supporting rod for the auxiliary wheels.

Another object is to provide a power take off from the vehicle drive shaft to one or both of the auxiliary wheels so that the vehicle low, reverse, and brake will control the traversing of the rear of the vehicle to the right, to the left, and control the braking of the traversing motion. The braking is effective as braking the rear wheels, in effect, brakes the drive shaft and the traversing device through the drive mechanism.

Another form of drive is where the auxiliary wheel support carries a reduction drive that meshes with said power take off that moves with the rear axle when the toggle is in the vehicle lifting position.

Another object of the invention is to increase the speed of raising and lowering of the auxiliary wheels and minimize the lifting height of the rear of the vehicle.

Another object is to use a single toggle to support two wheels and provide car stability superior to the use of a single wheel.

Another object is to use a signle toggle and folded wheels just rear of the rear axle to form the auxiliary support.

Another object is to provide a structure that can be applied to conventional motor vehicles with minimum unsprung weight, minimum or reduced changes necessary, no change in ground clearance, and minimum interference with the luggage compartment floor or foot board floor, as used with the rear facing seats in station wagons, etc.

Another object is to provide an auxiliary support that is sprung when inactive, and supports the vehicle largely through the rear wheel suspension system when active and is compact in the space required for storage.

Another object is to have the auxiliary wheels closely in line with the rear wheels and still be unsprung when inactive, double and folding.

Another object is to provide a compact parking device in back of the rear axle where more space is available, particularly if the spare tire is placed in one rear fender

2 and the gas tank in the other, as is common in some cars manufactured today, thereby keeping the parking device away from the space forward of the rear axle which is getting very limited with low frames and low floor boards and multiple mufflers.

Another object is to provide radius rods between the operating hydraulic cylinder and the toggle to keep the large lifting forces off the frame cross members, etc.

Another object is to provide a simple signal system for indicating when the device is moving up or down and also when the device is fully raised by another light by the use of a compact simple switch.

Other objects will be more particularly pointed out in the accompanying specification and claims and as illustrated by way of example in the accompanying drawings in which:

FIGURE 1 is a side view, partly cut away, of the rear portion of a vehicle showing one form of the invention;

FIG. 2 is a rear elevation view of the structure shown in FIG. 1, with parts cut away;

FIG. 3 is a view, similar to that of FIG. 1, with the lifting device in the retracted position;

FIG. 4 is a plan view, with parts cut away, of the mechanisms shown in FIGS. 1 and 2;

FIG. 5 is a side view of an alternate drive for the wheels on the lower toggle leg of the mechanism shown in FIGS. 1 through 4;

FIG. 6 is an enlarged perspective view of a portion of the drive mechanism shown in FIGS. 1 through 4;

FIG. 7 is an enlarged side view of a portion of the locator mechanism shown in FIG. 6;

FIG. 8 is a rear view of the auxiliary drive shaft support mechanism taken at section 8—8 of FIG. 4;

FIG. 9 is an enlarged side view partly in section of an alternate drive to that shown in FIGS. 1, 11 and 12;

FIG. 10 shows the drive of FIG. 9 about to be disengaged;

FIG. 11 is an enlarged view partly in section of the detachable drive connection of FIGS. 1 and 4 shown in engaged position;

FIG. 12 is an enlarged view of structure similar to FIG. 9 with the drive partly disengaged, and FIG. 13 is a view at section 13—13 of FIG. 4 to show the switch and lamp circuits diagrammatically.

In all views like numerals refer to corresponding parts.

In FIGS. 1 through 4, 7, 8, 11 and 12, a vehicle frame 15 is illustrated supported on rear wheels 16 through rear springs 17, rear shackles 18 and rear spring supports 19. An axle 21 connects the wheels 16 and houses the differential (not shown) to provide a drive from the engine through a drive shaft 22 and a universal joint 23. A double V-belt pulley 24 is mounted on a pinion shaft of the rear axle 21. Another double V-belt pulley 25 is mounted near the end of a jack shaft 26 which is suitably secured by a nut 27 for rotation in a housing 28 by bearings 29 as shown in FIGS. 11 and 12. The housing 28 supported on the differential housing by a bracket 30 is held against the rear axle 21 by a spring 31. The upper end of the spring 31 is supported on a bracket 32 which is suitably attached to the axle 21.

A toggle is composed of upper leg 33 and lower leg 34. The upper leg 33 is supported on a flexible shaft 35 journaled flexibly in mountings 36 and 37 to the frame 15. These mountings could be brass sleeves 38 inside compressible rubber-like supports 39 to allow limited vertical and non-aligned motion between the shaft 35 and the frame 15. The shaft 35 is also made to take vertical bowing between its ends so that hooks 41 engage axle pads 42 as the upper leg 33 of the toggle and the shaft 35 move from retracted position shown in FIG. 3. This access through the action of springs 43 attached to adjustable collars 44 and the hooks 41 by having the ends of spring 43 inserted in holes in the collars 44 and the hooks 41. Collar 45 bears against the hooks 41 to aid in the engaging and disengaging motion of the hooks 41 as the upper toggle leg 33 starts to rotate clockwise from its retracted position as viewed in FIG. 3 so that hook ends 46 engage or bear against the axle pads 42 to be in position to lift the axle 21 whenever wheels 47 and 48 of the lower toggle leg 34 start to lift the vehicle frame 15.

Shock absorbers 49 are connected between spring plates 51 at their lower ends and a frame cross member 52 at their upper ends. A lift cylinder 53 is actuated through fluid entering through the pipe 54 at its rear end or entering through pipe 55 at the cylinder front end as viewed in FIG. 3. The control of the lifting or retracting fluid is from the engine driven pump by suitable valves such as are shown in my U.S. Patent No. 1,884,932, entitled "Vehicle Lifting and Traversing Device" or my pending patent application, Ser. No. 700,216, now Patent No. 3,061,028, entitled "Vehicle Lifting and Traversing Device," or by any other suitable means, so that the control of the hydraulic lifting fluid is not shown herein in detail.

The cylinder 53 is pivoted at its rear end by a bolt 56 mounted on brackets 57 which are suitably mounted on a frame cross member 58. Radius rods 59 are mounted on the bolt 56 and are connected to the shaft 35 in the opening between the ears of upper toggle 33 where said ears are welded or otherwise secured to the shaft 35. A radius rod 61 is mounted on the bolt 56 and is attached to the lower toggle leg 34 by a bracket 62 by a bolt 63. A piston rod 64 is actuated by the cylinder 53 and is attached to a toggle pivot bolt 65 by a rod end 66 and a locking nut 67. A collar 68 limits the rearward motion of the piston rod 64 when it butts against cylinder head 69. Auxiliary wheels 47 and 48 are mounted for rotation on the lower toggle leg 34 on axles 71 and 72. The wheel 47 has a sprocket 73 attached thereto and the wheel 48 has a sprocket 74 attached thereto, the sprockets being driven by a chain 99.

When the piston rod 64 moves forward from the position shown in FIG. 3, an inactive position retaining hook 75 will be forced out of a roller 76 mounted on a flange 77 on the lower toggle leg 34 against the action of the hook 75 engaging a spring 78. The bolt 65 will continue to move forward and the shaft 35 will rotate clockwise as viewed in FIG. 3 to permit the hooks 41 to engage the axle pads 42 and lift the axle 21 when wheels 47 and 48 lift the car as the toggle legs 33 and 34 straighten out to the position shown in FIGS. 1, 2, and 4. The hooks 41 will bear against the axle pads 42 while the springs 43 unwind during the remainder of the lifting operation after the axle ends first contact the axle pads 42.

The jack shaft 26 is driven by the pulley 24, belts 79 and 81, and the pulley 25 from the drive shaft 22 and the universal joint 23. The double pulley 25 is attached to the shaft 26 by the nut 27. The rear end of the shaft 26 has a spline 82 which is engaged by an internally splined collar 83 mounted on a splined end 84 of a shaft 85, as illustrated in FIGS. 11 and 12. The shaft 85 is journaled in a bearing 86 in housing 87 of the lower toggle leg 34. A collar 88 rotates with the splined end 84 as it engages the flange 89. A spring 91 urges the splined collar 83 away from the collar 88 until a pin 92 butts the end of a groove 93 in the splined end 84. This action forms a drive between the spline 82 and the spline 84 in the vehicle fully lifted position of the toggle legs 33 and 34. When the toggle legs 33 and 34 are retracted slightly by the piston rod 64, the drive will be disengaged as shown in FIG. 12. The shaft 85 drives a gear 95 which meshes with a gear 96 inside a gear box 97. The gear 96 drives a shaft 98 which carries the sprocket 98a and drives the chain 99 which drives the sprocket 73 on the wheel 47 and the sprocket 74 on the wheel 48, the chain being adjusted by an idler 100. The wheels 47 and 48 are preferably not aligned but their axis are pointed at a point near the center of the front wheels so they will roll on an arc about the center of the front wheels to reduce the tendency to creep forward or backward during a circular traverse. Some flexibility of the location of the rear portion of the shaft housing 28 may be desirable during driving engagement or disengagement of spline collar 82. The spring 31 is supported on the bracket 32 and the radius rod 101 is ball mounted at each end at 102 and 103 with the end 103 spring retained by a spring 104.

An alternate detachable drive is shown in FIGS. 9 and 10 wherein the splined end 82 of the jack shaft 26 is engaged by an internal splined collar 105 mounted on a ball spline 106 with a spline 107 cut therein to mesh with the internal spline of the collar 105 and the splined end 82. A collar 108 is welded at 109 to the collar 105 and prevents a spring 111 from forcing the collar 105 off of the ball 106 as the inner diameter of the collar 108 is smaller than the outside diameter of the ball 106. The spring 111 tends to hold the collar 105 in line with the shaft 85 but allows a limited universal action during engagement or disengagement with the spline end 82. The spring 111 bears against a collar 112 mounted on the shaft 85 by a pin 113. When the vehicle rear wheels are raised, as shown in FIGS. 1 and 2, with the rear wheel drive placed in low gear, the car will traverse slowly to the right as viewed in FIG. 2 and to the left when the rear wheel drive is in reverse with the rear wheels rotating. When the driver wishes to stop, the foot or hand brake will stop the rear wheels, the axles 114, the pinion shaft pulley 24, the belts 79 and 81, the pulley 25, the shaft 26, the splined end 82, etc. and through the drive mechanism the wheels 47 and 48. The slight angle of the wheels 47 and 48 and sprockets 73 and 74 is within the limits of allowable mis-alignment for chain drives at limited speed and a short duration of operation.

In FIGS. 4 and 13, a switch 115 is illustrated having an arm 116 in contact with a segment 117 when the vehicle is in the fully lifted position. This occurred due to the rotation of the shaft 35 and the switch arm 116 to complete a circuit and light a green light 118 to indicate traversing can be undertaken. When retracting the toggle legs 33 and 34, the switch arm 116 moves onto a contact segment 119 to light another indicator light 121, preferably red, to show that the device is in the process of raising or lowering. When fully raised, the arm 116 will move off of the contact segment 119 and both lights will go off, indicating that the device is fully retracted and locked by the inactive retaining position hook 75 which is in engagement with the roller 76 by the action of the spring 78. By this switch design, one arm 116 of the switch 115 operates two indicator lights in a desired manner.

In FIGS. 6 and 7 a device is illustrated for assisting in the lining up of the shaft 26 and the spline 82 with the internal spline collar 83 and the spline 84 of the shaft 85 when the shaft 85 swings down from its retracted position shown in FIG. 3 to the vehicle lifted position shown in FIG. 1. The spring 31 will hold the rear of housing 28 raised against the axle 21 in a non-rattling relationship, when the toggle leg 34 is folded up, as shown in FIG. 12 before the driving connection with splined collar 83 is made. As the splined collar 83 swings down into meshing relation, a fork end 122 on an adjustable bolt 123 with a jamb nut 124 supported on a bracket 120 and plate 130 will assist in locating the splined end 82 in line with an internal splined collar 83 for meshing relation. This will force the rear portion of the housing 28 and the splined end 82 downwardly slightly below the axle 21 as the internal splined collar 83 swings forward and downward from the position shown in FIG. 12 with the final rotation into lifting position of the toggle leg 34 as shown in FIGS. 1, 2, 6, 7 and 11. A V-slot in a locator 122 relatively moves the splined end 82 and the internal spline collar 83 into alignment to take care of any slight horizontal misalignment due to lifting the car on a slight incline facing right or left which may spring the shaft 35 slightly to require a slight right or left up or down motion of the splined end 82 during engagement, disengagement, or during acceleration or braking during the traversing operation. Such motion will be minimized by the hooks 41 engaging the axle pads 42 prior to the lifting operation. The rod 101 is spring mounted at the ball joint 103 by springs 104 as shown in FIG. 8, to allow limited right and left motion of the spline end 82.

In FIG. 5 a slightly different arrangement is illustrated of a drive engaging shaft which is similar to the shaft 85. A spring 128 presses against a collar 129 on the outside of a universal joint nested underneath to hold a shaft 131 in alignment with the axis of the gear 95 as shown in FIG. 2 in the gear box 97. The outer end of the shaft 131 has the collar 88, the spring 91, and the internal splined collar 83, which are all similar to the construction shown in FIGS. 1, 3, 4, 11 and 12. However, the universal joint inside of a collar 129 allows more adjustment or motion to the spline collar 83 which may be desirable in making engagement with the spline 82 during the movement of the toggle leg 34 into vehicle lifting and traversing position or during the flexing of the shaft 35 during the traversing or lifting operations. The spring 128 is preferably strong enough to hold a shaft 131 in alignment without rattling when in the inactive position.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limited.

What is claimed is:

1. In a lifting device for a vehicle having a sprung and an unsprung portion, rear wheels on said unsprung portion mounted on an axle, a ground engaging element carried by said vehicle sprung portion rearwardly of the axle, means for swinging said ground-engaging element counterclockwise into ground engaging position, means interconnecting said sprung and unsprung portions for raising them together, said swinging means retracting said ground engaging element by swinging it clockwise to a substantially horizontal position in rear of said rear axle, and a rod pivoted at one end to a rear cross member of the vehicle and having its other end pivoted to the ground engaging element for controlling its path of movement.

2. In a lifting device for an automobile having a body, a differential housing and springs disposed therebetween, a support ground engaging means on said support, a link pivoted at one end to said support forming a toggle therewith, a support rearwardly of the differential housing for supporting the other end of said link, a ram pivoted to the rear end of the body and to the pivot connecting the link to the first mentioned support, a rod interconnecting the body adjacent to the ram and said link supporting means, and a rigid inflexible rod interconnecting said body adjacent to said ram and said first mentioned support for guiding the movement of said first mentioned support from a substantially horizontal to a substantially vertical position when the ram is extended for raising the rear end of the automobile.

3. In a vehicle lifting device, a ground engaging element, means including a movable member for actuating said element from an active to an inactive position, a switch having a central and two end contacts and a movable contact arm, means mounted on said movable member for operating said switch contac arm, two indicating means, in circuit with an end and the central contacts, said contact arm when engaging the central contact operating one of said indicating means to signal the position of the element when between active and inactive positions, said contact arm when engaging the one said end contact operating the other said indicating means to signal that the element is in ground-engaged vehicle-raised position, when said contact arm is engageing the other end contact both said indicating means being inoperable and the element is in fully retracted position.

4. A vehicle lifting device including a toggle having two legs joined by a pivot, pivot means for securing the free end of one leg to the vehicle, a ground-engaging member secured to the free end of the other leg of said toggle, a ram having one end secured to the pivot joining the legs of the toggle, and a pair of rods secured together at one end by a pivot which also secures the other end of said ram to the vehicle, the opposite end of one rod being secured to the other leg of said toggle remote from the pivot thereof, and the opposite end of the other rod being pivoted to the pivot at the unjoined end of the said one leg of the toggle.

5. In a lifting device for a vehicle having a chassis supported on front and rear axles, an elongated ground-engaging element, a link pivoted to one end of the ground-engaging element and to the chassis rearwardly of the rear axle for forward and rearward pivotal movement, a ram having one end pivoted to the chassis rearwardly of the rear axle and the other end extending forwardly and connected to the pivot which joins the link to the ground-engaging element, and a second link pivoted to the chassis and to the ground-engaging element at a point remote from the pivot thereof.

References Cited by the Examiner

UNITED STATES PATENTS

| | | | |
|---|---|---|---|
| Re. 18,904 | 7/33 | Walker | 180—1 |
| 1,742,566 | 1/30 | Walker | 180—1 |
| 1,884,932 | 10/32 | Walker | 180—1 |
| 1,884,933 | 10/32 | Walker | 180—1 |
| 1,896,118 | 2/33 | Wellensiek | 180—1 X |
| 2,002,724 | 5/35 | Walker | 180—1 |
| 2,005,173 | 6/35 | Walker | 180—1 |
| 2,808,271 | 10/57 | Devenne | 180—1 X |

A. HARRY LEVY, *Primary Examiner.*

PHILLIP ARNOLD, *Examiner.*